INVENTORS
JEAN DE SOUZA LAGE
CLAUDE MICHEL BRUNEAU

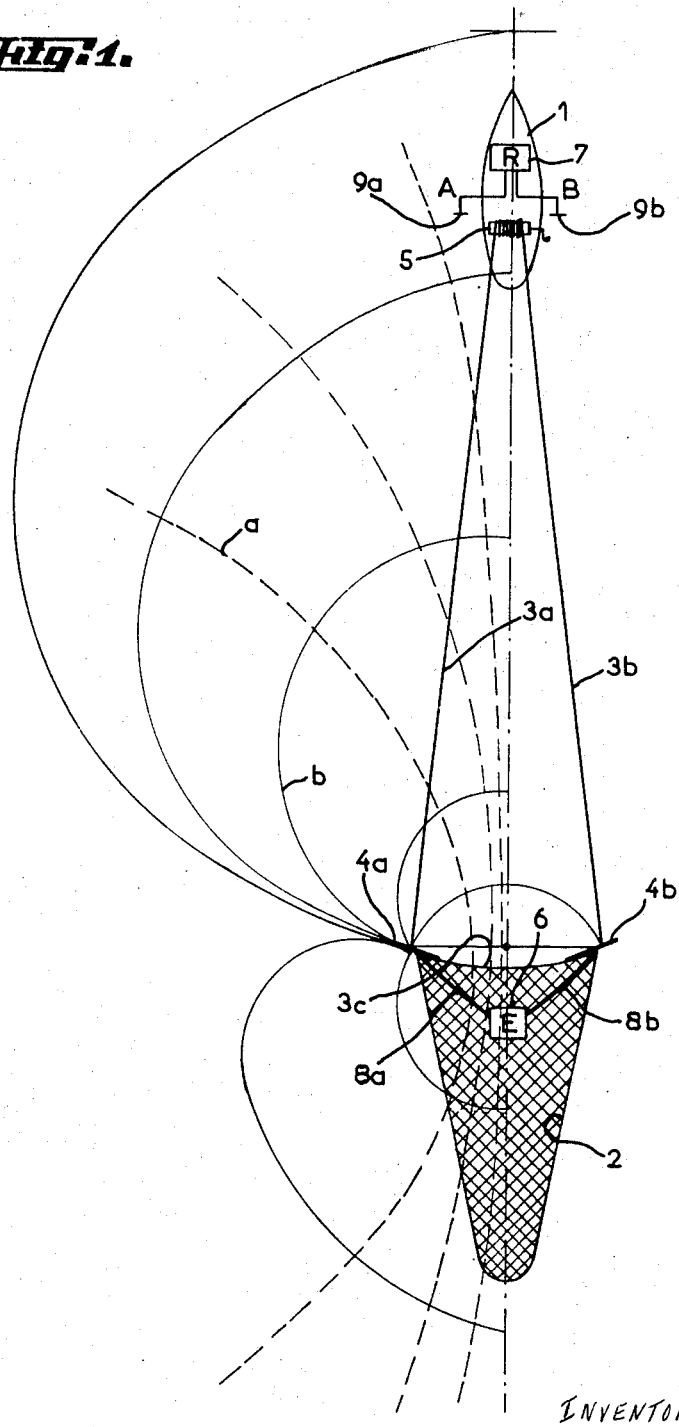

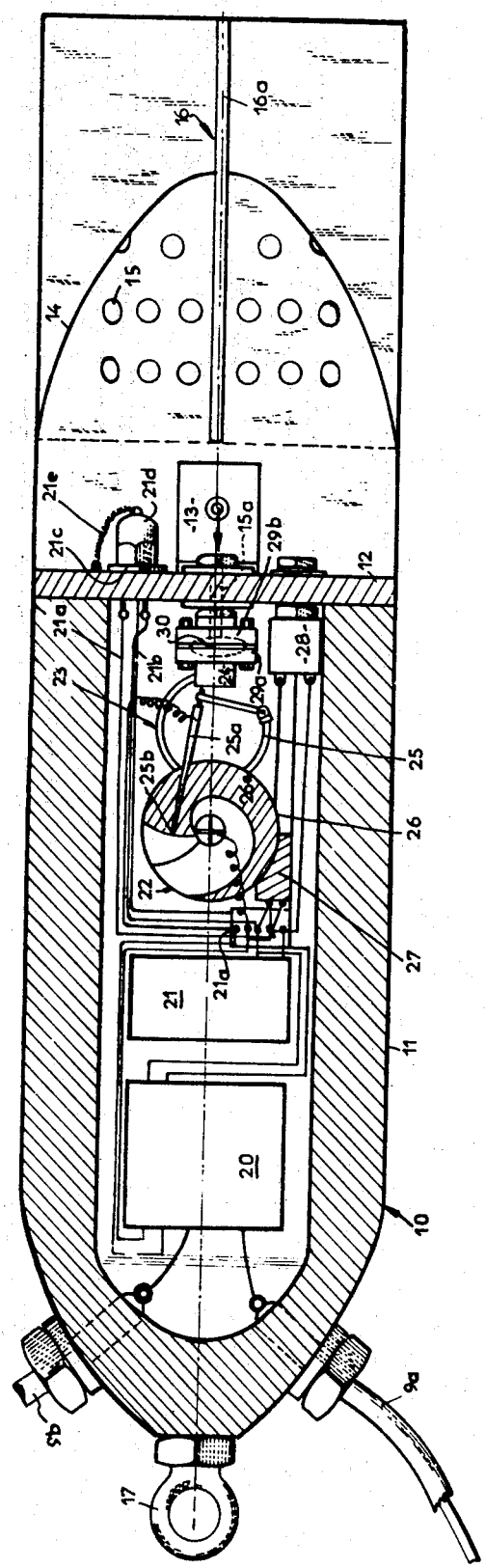

Feb. 23, 1971 J. DE SOUZA LAGE ET AL 3,566,345
SYSTEM FOR TRANSMITTING TO A VESSEL INFORMATION FROM
A SUBMERGED UNIT TRAILING BEHIND THE VESSEL
Filed March 26, 1969 5 Sheets-Sheet 4

INVENTORS
JEAN DE SOUZA LAGE
CLAUDE, MICHEL BRUNEAU
BY: Steinberg & Blake
attys

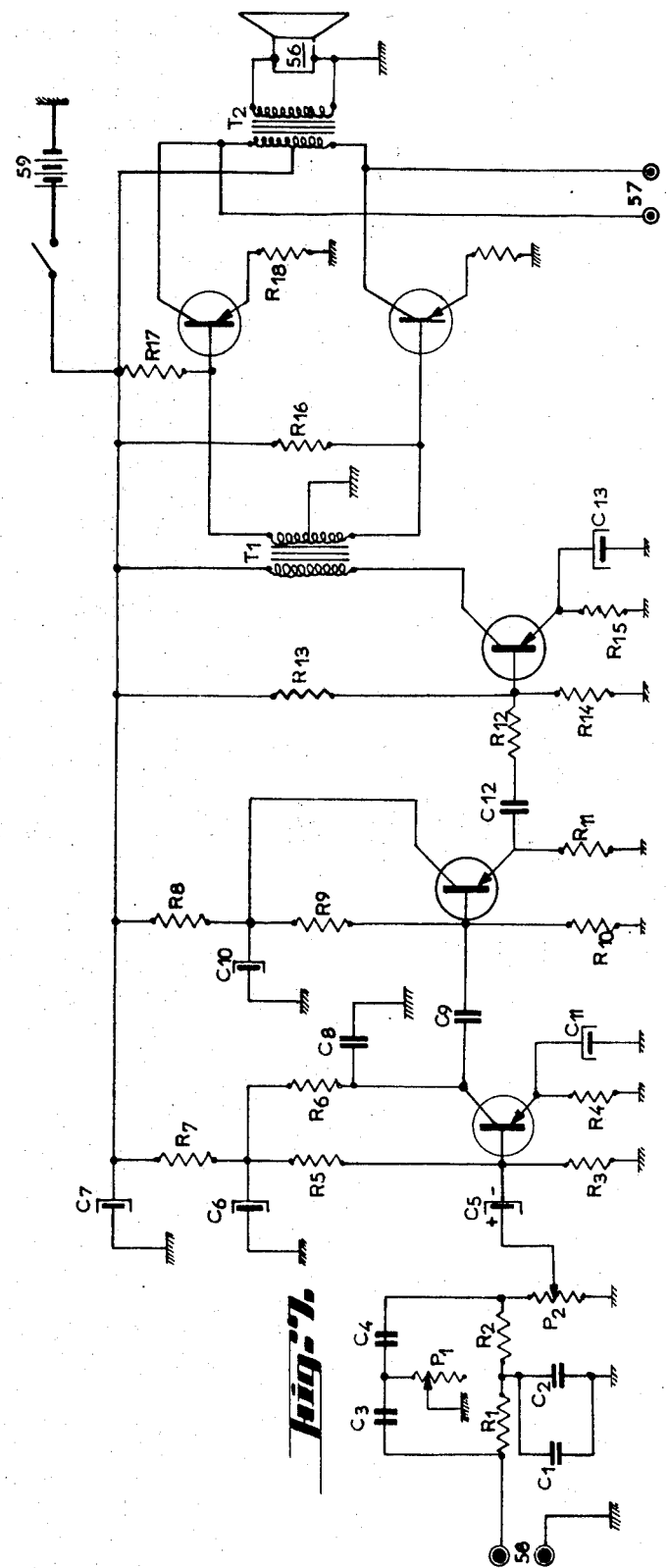

United States Patent Office 3,566,345
Patented Feb. 23, 1971

3,566,345
SYSTEM FOR TRANSMITTING TO A VESSEL INFORMATION FROM A SUBMERGED UNIT TRAILING BEHIND THE VESSEL
Jean de Souza Lage, Saint-Firmin, France, and Claude Michel Bruneau, 1 Villa Marceau, Paris XIX°, France
Filed Mar. 26, 1969, Ser. No. 810,534
Claims priority, application France, June 12, 1968, 154,732
Int. Cl. H04b 13/02
U.S. Cl. 340—4
11 Claims

ABSTRACT OF THE DISCLOSURE

The device of the invention comprises a gauge carried by the trawl and a receiver carried by the trawler. The gauge is constituted by a device for measuring the immersion depth of the trawl and by a transmit assembly for transmitting underwater electric signals, said transmit assembly comprising a dipole. The receiver comprises a dipole which is immersed and connected to the hull of the trawler.

---

The present invention has essentially for its object a detection system, applicable more particularly to the determination of the immersion depth of the trawl or drag-net of a trawl-fishing vessel.

The invention thus concerns a device for detecting the immersion depth of a trawl, as well as the trawl equipped with the transmit system of the said detecting device.

In addition, the invention is directed to all devices involving an application of a detection of the aforesaid type.

It is known that trawl-fishing vessels are generally equipped with an ultrasonic depth-finder enabling them to detect with a high degree of accuracy, the depth at which schools or shoals of fish, are located below the vessel keel; in order to be certain to catch the fish in the trawl being trailed behind the vessel at a distance possibly exceeding 1,000 m., the depth at which the trawl is located must be known at every moment and exactly. In the devices used for this purpose up to the present, the information picked at the trawl is transmitted along an insulated cable parallel with a single or two drag lines or cables of the trawl; when the trawl is hauled in, the said insulated cable and the drag lines are rolled up separately by means of two winches.

This known method involves several drawbacks when the fishing is being carried out in rough weather. In fact, the said second cable is then subjected to elongations leading to a reduction of its mechanical resistance or strength and modifying its electrical characteristics. Furthermore, the said second cable tends to wind round the drag-line or lines, and this considerably complicates the hauling of the trawl onto the trawler.

It has also been proposed to transmit through the drag-line signals characterizing the immersion depth of the trawl, the said drag-line being usually of metal, but not insulated. However, the carrying out of this method of detection gives rise to certain difficulties, the major inconvenience consisting in that it is not applicable where non-metal drag-lines, for instance nylon lines, are used.

The system according to the present invention enables to obviate these various inconveniences in the sense that it is applicable whatever the manner of dragging the trawl may be, it is simple to carry out and gives rise to no difficulties during the hauling of the trawl onto the vessel.

In addition, it enables to effect the detection even when the trawl is several kilometres apart from the trawler.

Furthermore, the cost of the devices is low.

A device according to the invention for detecting the immersion depth of a trawl is therefore remarkable in that it comprises a gauge carried by the trawl and constituted by a device for measuring the immersion depth of the said trawl and by a transmit assembly for transmitting underwater electric signals from the trawl to the trawler without using any metal support for the said signals, the said transmit assembly comprising a dipole, the two electrodes of which are disposed symmetrically with respect to the axis of the trawl, in areas of the latter spaced from one another, and on the other hand, a receiver carried by the trawler and comprising a dipole, the two electrodes of which are immersed and disposed symmetrically with respect to the axis of the trawler.

According to a characteristic feature of the present invention, the electrodes carried by the trawl are placed at terminal points of the line of maximum width of the trawl in spread position, and are connected to the transmit assembly by two insulated cables.

According to a preferred form of embodiment, the said gauge is constituted by an impervious casing containing the measuring device and the receive assembly, the gauge being placed on the top rope of the trawl and on the axis of the latter.

According to a characteristic feature of the invention, the said gauge is provided with at least one dome-shaped stream-line element extending in prolongation of the said casing; the said stream-line element is preferably provided with a plurality of uniformly spaced holes communicating with the measuring device so as to prevent dynamic pressure from appearing at the said casing, so that, should pressure be the quantity to be measured by the measuring device of the gauge, this pressure will be equal to static pressure, the latter being the only quantity enabling to accurately determine the immersion depth of the gauge.

The two electrodes carried by the trawl are constituted by two metal plates respectively arranged so as to be substantially normal to the direction joining each electrode to the area occupied by the trawler.

According to a characteristic feature of the invention, the receiver located aboard the trawler comprises a voltage amplifier for the signal picked up by the two electrodes of the receive system of the said device.

According to a preferred form of embodiment of the present invention, the said two electrodes are constituted by two immersed metal plates placed at approximately 1 to 4 m. from the hull of the trawler and electrically insulated from the latter; according to a modified embodiment, the said two electrodes are constituted by two immersed metal plates fitted on the said hull and insulated from the latter.

The aforesaid gauge comprises preferably a rudder member at at least one of its ends, the said rudder member being for instance constituted by two flat elements intersecting at right angles.

According to a form of embodiment of the invention, the aforesaid casing is separable into at least two substantially symmetrical sections, one of which contains the transmit assembly and the other the measuring device, a plug-and-socket connection being provided between the said measuring device and the said transmit assembly, thus enabling to readily use measuring devices of various sensitivities without it being necessary to change the transmit assembly.

According to a characteristic feature of the invention, the said measuring device is a pressure-measuring device, the pressure-sensitive element of which is constituted by a Bourdon tube.

According to another characteristic feature of the invention, the said measuring device is based on the use of an ultra-sound transmitter, the said ultra-sounds being reflected by the free surface of the water or by the bottom and then received by an appropriate detector.

According to another characteristic feature of the invention, the active or operative part of the said transmit assembly transmits to said electrodes a signal, the frequency range of which is comprised, for instance, between a few hundreds to a few thousands of c.p.s.

A coding device actuated by the said measuring device controls the transmission of the signal from the transmitter so that the latter transmit periodically the information supplied by the measuring device.

The signal transmitted may be based on the principle of transmission at the aforesaid frequency interrupted by silences proportional to or, more generally, depending on the quantity to be measured. With a view to reducing power consumption, recourse may also be had to a transmission of short signals separated by time intervals depending on the said quantity.

According to a preferred form of embodiment, the said coding device is constituted essentially by a disk rotated at a uniform speed and one face of which is a code-carrying face in contact with a movable member whose displacements are related to the variations of the quantity to be measured, the said disk being disposed so that the said movable member moves either from the center to the periphery of the said disk or in the opposite sense, depending on the sense of variation of the said quantity, the aforesaid silence taking place, owing to a relay actuated by an electric contact occurring at the code-carrying face of the disk, from the instant the said movable member meets a first stationary calibration curve provided on the said code-bearing surface until the instant the said movable member meets a second stationary calibration curve on the said surface; the duration of the said silence is preferably proportional to the depth.

Of course, the receiver output is advantageously transmitted to a loudspeaker, a head receiver or headphone, registering device, etc.

Other characteristics and advantages of the invention will appear from the following description.

In the appended drawings given solely by way of example:

FIG. 1 diagrammatically illustrates a trawler and its trawl equipped with a device according to the present invention;

FIG. 2 is a partial longitudinal section of the gauge of a device according to a first form of embodiment of the invention;

FIG. 7 shows a circuit diagram of the receiver of FIG. 6.

Figure 4:
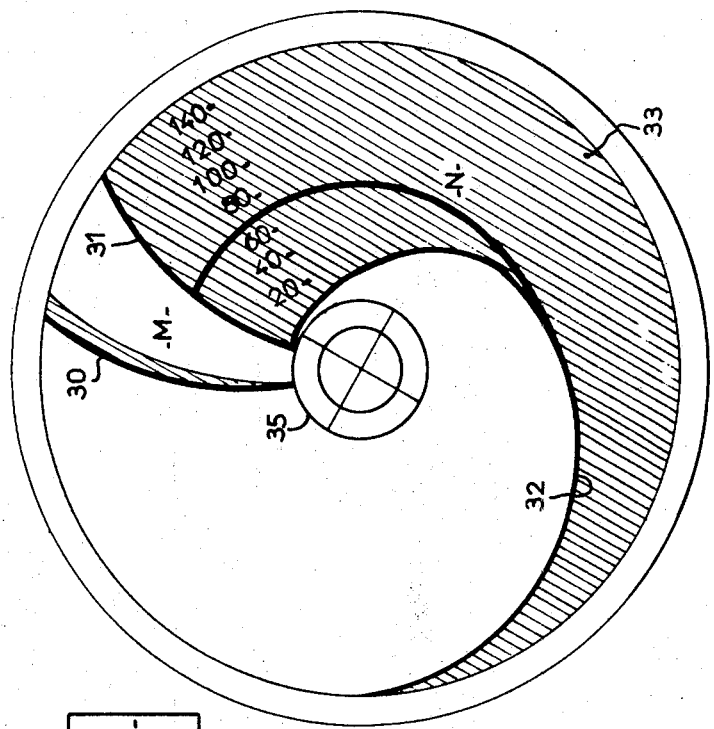
FIG. 4 is a top view of the code-carrying disk of the gauge of FIG. 2.

FIG. 1 shows a trawler 1, the trawl 2 of which is assumed to be in immersed position at a certain depth below the free surface of the water. The drag-lines or cables 3a and 3b of the trawl are steel or nylon cables rolled round a winch 5. Reference digit 6 denotes a gauge carried by the trawl 2 and connected by insulating cables 8a and 8b, respectively, to emitting electrodes 4a and 4b forming a dipole; the spacing between the said electrodes corresponds to the maximum transverse dimension of the spread trawl, for instance approximately 40 m.; the top rope of the trawl 2 is indicated by the reference digit 3c.

The receiver 7 placed aboard the trawler 1 is connected to two immersed electrodes 9a and 9b disposed symmetrically with respect to the axis of the vessel; in the example illustrated, the spacing between the electrodes 9a and 9b is, for instance, 6 m., that is to say the electrodes are placed at approximately 1 m. from the hull of the trawler 1.

The equipotential curves of the field produced by the electrodes 4a and 4b are represented by dashed lines while the lines of force of this field are denoted by continuous lines b.

It is noted that owing to the relative positions of the trawl and the trawler, the position of the segment AB connecting the electrodes 9a and 9b is substantially situated on one of the said lines of force.

The circuit impedance of the receiver 7 must be low with respect to that of the portion AB of the line of force passing through the points A and B.

If the vessel is made of metal, there occurs a distortion of the theoretical equipotential curves, the configuration of which is shown in FIG. 1, as well as a distortion of the lines of force; notwithstanding this distortion phenomenon, it has been established that satisfactory measuring is obtained when the aforesaid relation concerning the circuit impedance of the receiver is observed.

The device for detecting the immersion depth of the trawl 2 shown in FIG. 1 has for instance the following characteristics:

(a) Transmitter:
  Power—1.6 w.
  Output impedance—0.5Ω.
  Frequency—860 c.p.s.
  Spacing between electrodes 4a and 4b—40 m.
  Transmitter range—1,000 m.
(b) Receiver:
  Threshold sensitivity—In the region of 1 milliampere.
  Spacing between the receiving electrodes 9a and 9b—6 m.

With the device according to the present invention is associated a device for detecting fish schools, the latter being fixed under the vessel hull; this device is of a type known per se and is based on the principle of transmission, reflection and reception of ultra-sounds.

It is therefore possible, depending on the information supplied by the receiver 7, to cause the immersion depth of the trawl 2 to coincide with the depth of the fish school, by rolling or unrolling the drag-lines 3a and 3b on or from the winch 5 or by varying the speed of the vessel.

The emitting electrodes 4a and 4b may advantageously be secured to plates (not shown) enabling the trawl mouth to be opened.

It will be seen, therefore, that with the system of the invention as illustrated in FIG. 1, the signal transmitting means 6 has its dipole electrodes 4a and 4b symmetrically arranged on opposite sides of the axis of the submerged and trailed unit 2 while the signal receiving means 7 on the vessel 1 has its dipole electrodes 9a and 9b also symmetrically situated with respect to the axis of the vessel 1. However, the distance between the electrodes 4a, 4b of the signal transmitting means 6 is several times as great as the distance between the electrodes 9a, 9b of the signal-receiving means 7. Moreover, each of the electrodes 9a, 9b is spaced out beyond the hull of the vessel 1 by a distance of 1–4 m.

The gauge 10 represented in FIG. 2 comprises a metal, for instance stainless steel, bronze or brass casing, the characteristics of which are designed so that it remains rigid at high pressure values, thus enabling to carry out the fishing at depths reaching for instance 700 m. (static pressure ranging to 70 kg./cm.$^2$); according to a modified embodiment, the said casing may be made of plastics. The metal or the plastics must be also selected according to its resistance to sea-water corrosion.

The casing 11 is closed at its right end by the mounting plate 12, also of sufficient thickness to withstand high pressure. On the mounting plate 12 is secured, by means of four angle brackets such as shown at 13, a dome-shaped stream-line element 14 provided with holes such as 15 eliminating the dynamic component of pressure at the gauge, so that the latter is sensitive only to the static component of pressure, the latter being perfectly known for a given depth of immersion, whatever the trawl-dragging speed may be.

At the same end of the gauge 10 is provided a rudder member 16 constituted by two further elements 16a and 16b intersecting at right angles.

At the left end of the casing 11 is adapted an eye 17 enabling to mechanically couple the gauge to the structure of the trawl, for instance to the top rope of the latter or directly to the starting point of the single drag-line or one of the drag-lines; this coupling plays no part in the transmission of the signal to the detector.

The transmission of the signal to the emitting electrodes is achieved by means of armoured cables 18a and 18b (similar to the cables 8a and 8b of FIG. 1); the conductors of these cables are insulated from the casing 11.

Inside the casing 11 are disposed successively, from left to right in FIG. 2, a transmit assembly composed of a transmitter 20 and a rechargeable battery 21, a coding device 22 and a pressure-measuring apparatus 23.

Figure 3:
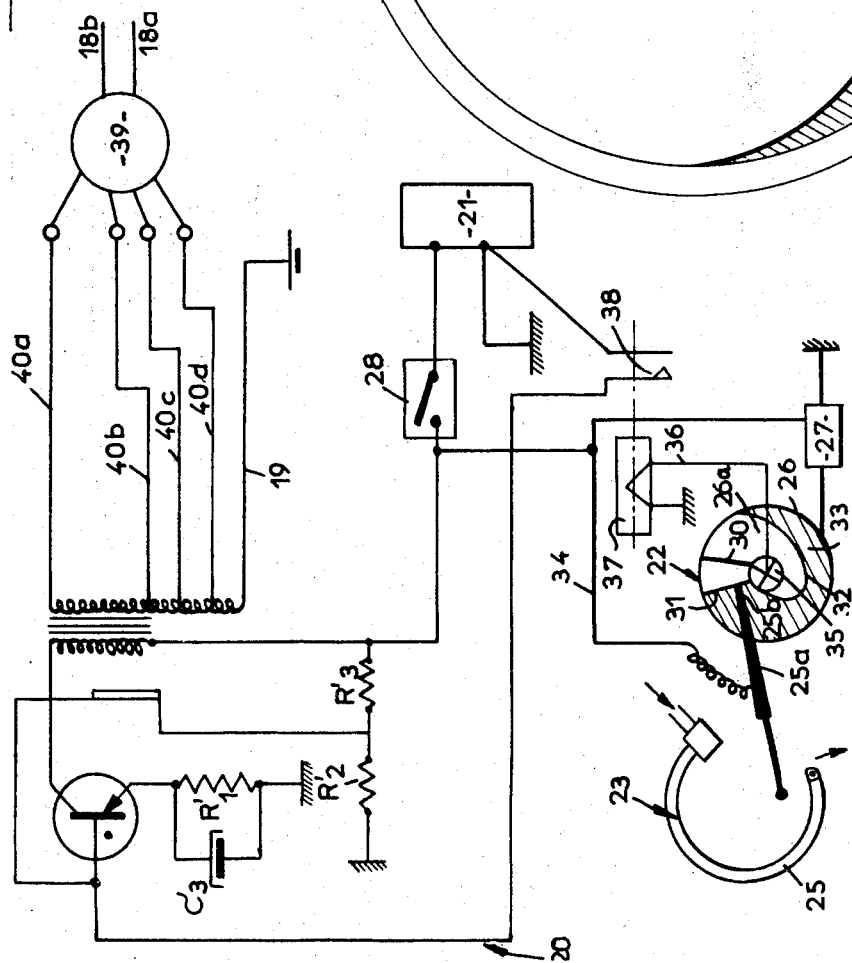
FIG. 3 is a circuit diagram of the transmit assembly, the coding device and the measuring device of the gauge of FIG. 2.

The transmitter 20 is a converter continuously transmitting a signal, the frequency of which ranges for instance to 800 c.p.s. (the constitution of this converter is shown in FIG. 3).

The battery 21 may be recharged through conductors 21a and 21b and a terminal 21c protected by an impervious cap 21d attached by a small chain 21e to the mounting plate 12; the battery 21 can thus be recharged at will without it being necessary to open the gauge casing.

The measuring device 23 is essentially constituted by a separator member 24, a Bourdon tube 25 and a code-carrying disk 26 rotated at a uniform speed by a motor 27.

A contactor-manometer 28 enables the gauge to be put into operation when the trawl reaches a small predetermined depth, for instance in the region of twenty metres, and the same contactor-manometer puts the gauge out of operation when the trawl is raised again and reaches the said level. Thus, the duration of operation of the gauge is reduced, and, consequently, power consumption is also reduced.

The separator member 24 is constituted by a small metal box divided into two compartments 29a and 29b by a separating membrane 30 capable of being deformed elastically depending on the pressure difference between the said two compartments; this membrane consists for instance of a metal membrane coated with synthetic rubber, for instance neoprene. The compartment 29b is connected with the external pressure by conduit 15b opening in the dome-shaped member 14.

The function of this separator is to prevent the Bourdon tube from being deformed irreversibly in case of overpressure and also to preclude direct contact between sea-water and the said tube, thus protecting the latter from corrosion. According to a modified embodiment, the separator 24 may be dispensed with and the interior of the Bourdon tube 25 may be made to communicate directly with the surrounding medium; in the latter case, however, the tube must be of inalterable material, for instance stainless steel, and protected from overpressure by any other appropriate means.

The indicating member of the pressure-measuring device has the usual shape of a pivoting index 25a, the tip 25b of which is in contact with the code-carrying surface 26a of the disk 26.

Referring now to FIG. 4, it can be seen that three curves 30, 31 and 32 are traced on the said surfaces. The curve 30 corresponds to a conducting area and so does the entire hatched area 33 comprised between the curves 31 and 32. It is observed that the curves 30 and 31 are centered on the center of rotation of the indicating element 25a corresponding to the location of the tip 25b of this element when the code-carrying disk 26 is stationary and pressure is modified. The code-carrying disk rotates for instance at a speed within the range of one to two r.p.m., so that during the scanning of the area 33 pressure varies but little; to an elementary rotation of the code-carrying disk 26a therefore corresponds a scanning of the area 33 according to an arc of a circle such as for instance the arc MN, the length of the latter being proportional, owing to the configuration of the calibration curve 32, to the depth of immersion increasing in the centrifugal sense of the code-carrying face 26a; considering this disk, it is seen that for an arc MN, the depth of immersion is 70 m., the said disk being applicable to the measurement of depths of immersion ranging from zero to 150 m.

The operation of the gauge of FIG. 2 will be described with reference to the diagram of FIG. 3 showing in detail the constitution of the transmitter and the electrical connections thereof, the battery 21, the coding device 22 and the pressure-measuring device 23 materialized in this case by the Bourdon tube 25. As noted in this figure, the indicating element 25a is connected to the electronic converter constituting the transmitter 20 through a conductor 34, while the hatched conducting area 33 is connected, as well as the internal end of the curve 30, to a conducting element 35 which is itself connected through a conductor 36 to a relay 37 acting upon a contact 38 which, when closed, closes the feed circuit of the electronic converter; the relay 37 is designed so as to open the contact 38 when fed, i.e. when the tip 25b of the indicating element 25 comes into contact with the curve 30 or with any point in the conducting area 33.

The closure of the contact of the contactor-manometer 28 occurs when the bathygraph is put into operation, as soon as the trawl reaches a predetermined depth. When the interrupter 38 is closed and the relay 37 is not fed, the electronic converter 20 supplies a signal which is transmitted to the emitting electrodes through cables 18a and 18b. A switch 39 is provided between the cables 18a and 18b and the conductors 40a to 40d. The switch is an impedance adapter enabling to obtain a signal of maximum intensity at the receiver.

The contact 37 of the relay 38 is closed at predetermined positions of the indicating member 25 on the code-carrying disk, and only at that moment is the converter, that is to say the transmitter, put into operation, so that the power consumption of the transmit assembly is reduced as much as possible.

When the tip 25b of the indicating member 25 meets the curve 30, the circuit of the relay 37 closes a short instant and, consequently, the contact 38 is opened, thus producting a brief silence (interruption of the high frequency signal) at the input of the electronic converter; this brief silence fulfils the function of a reference signal. When the relay 37 is fed again, i.e. when the tip 25b of the indicating member 25a meets the curve 31 of the conducting area 33, the opening of the contact 38 entails a further interruption of the high frequency signal transmitted through the cable 18, the said interruption lasting until the tip 25b reaches the curve 32 of the hatched area 33; as already mentioned above, the duration of this interruption allows to determine the immersion depth of the gauge.

The transmit assembly comprising the electronic converter 20 and the battery 21 can be readily separated from the measuring device 23 and the coding device 22 owing to the use of a multiple-pin plug-and-socket connection 21a, not shown in FIG. 3, but visible in FIG. 2.

Figure 5:
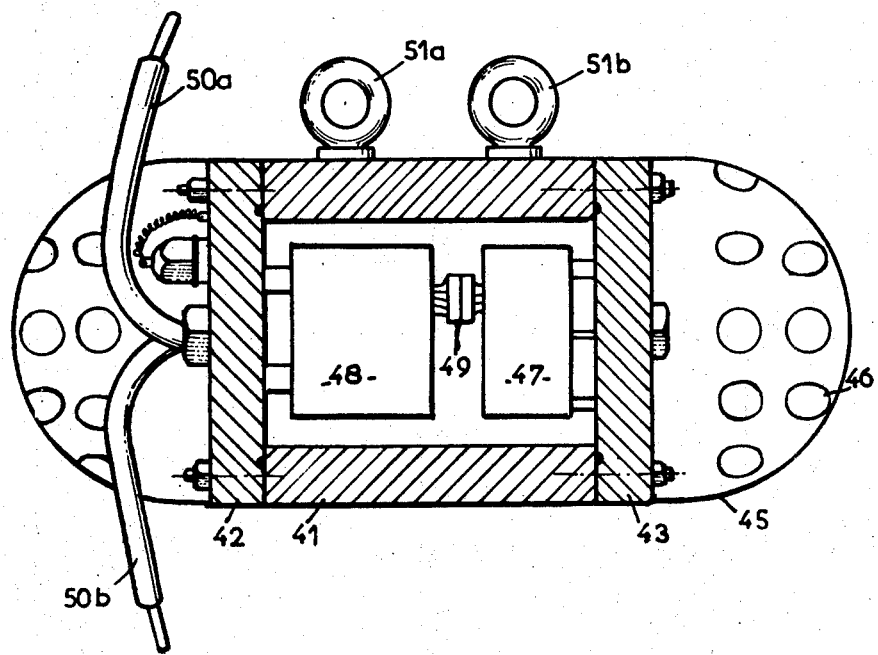
FIG. 5 is a longitudinal section of the gauge of a device according to a second form of embodiment of the invention.

The gauge represented in FIG. 5 comprises a casing 41 detachably mounted on two mounting plates 42 and 43 to which are respectively fixed, by means of angle irons or brackets (not shown), stream-line elements 44 and 45 provided with holes such as 46.

The depth measuring device (which may be constituted for instance by a Bourdon tube or an ultrasonic transmitter) as well as the coding device are conventionally represented at 47, whereas the transmit assembly comprising an electronic converter and a cell or accumulator battery are conventionally shown at 48; the assemblies 47 and 48 are respectively mounted on mounting plates 43 and 42; these two parts are interconnected by a plug-and-socket connection 49. Owing to the manner in which the casing 41 is mounted on the plates 42 and 43 and to the use of a plug-and-socket connection 49, the two essential functional parts of the gauge according to this form of embodiment can be rapidly separated. The assembly 47 can thus be readily replaced when it is desired to pass from one range of depth to another; for instance, there can be provided assemblies, the respective sensitivities of which correspond to the following ranges: 0 to 150 m.— 100 to 250 m.—200 to 400 m., etc.

In order to prevent the functional elements of the gauge according to the invention from being damaged by shocks or impacts, the said elements may be mounted on damping blocks.

At 50a and 50b are shown the connecting cables to the emitting electrodes and the eyes or rings enabling to attach the gauge to the trawl structure are indicated at 51a and 51b.

Figure 6:
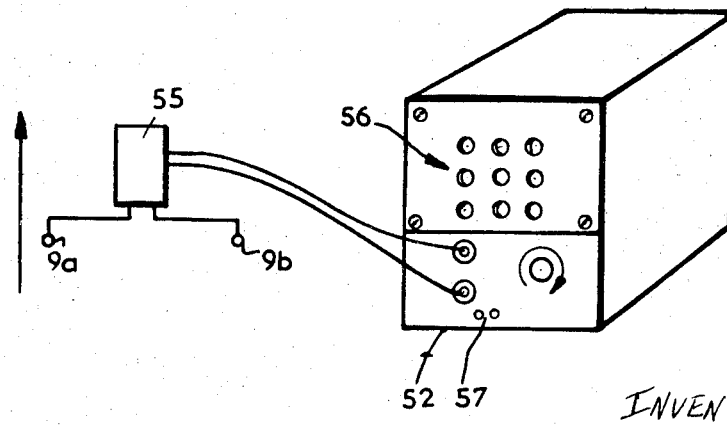
FIG. 6 is an external view of the receiver of a device according to the invention.

In the perspective view of FIG. 6 is seen the receiver 52 receiving the signals transmitted through the cables 18a and 18b from the gauge of FIG. 2 or the cables 50a and 50b from the gauge of FIG. 5; the signals received by the dipole 9a–9b are amplified at 55 in a manner known per se, the said signal being converted in the receiver 52 in such a manner as to be used at a first output to which may be connected a loud-speaker such as 56 or at a second output 57 to which may be connected for instance a headphone or a registering device (see also FIG. 7); the final signal may also be transmitted to a sounding indicator of any other type or to a luminous indicator.

FIG. 7 shows a detailed circuit diagram of the receiver of FIG. 6; the two outputs are shown at 56 and 57 and the input at 58, this detector being fed from a battery 59.

Various coding devices may be used without departing from the scope of the invention; for instance, the code-carrying disk of FIGS. 2, 3 and 4 may be coded according to the binary system or the Morse system; detection on the coded disk may be achieved by means other than a moving detecting element rubbing against the coded surface; for instance, recourse may be had to an optical system comprising a photoelectric cell and a luminous source of variable position with respect to the latter, the position variation being produced by the aforesaid measuring device; the coding device may also be based on a variation of electric flux or a variation of capacity produced by the measuring device.

The device described with reference to the figures consists essentially of a bathygraph owing to the fact that the measuring device of the gauge is of a nature enabling to determine the depth of the latter, by modifying the nature of the measuring device, this apparatus may also be used for measuring water temperature or any other desired quantity transmitted to the coding device.

The method according to the invention is also applicable to the transmission of signals for any desired purpose, notably for underwater information or control.

Thus, devices based on this method can be used for the purpose of applications in the field of oceanographic techniques, fishing techniques or military techniques; the signals thus transmitted may be used for the purpose of information or control; thus, such signals may be transmitted from a submarine or a frogman or a ship or any isolated immersed device, to a receiver carried by a unit pertaining to the category of units mentioned above; the transmitter may be advantageously acted upon by means of a Morse key or a microphone, while the output of the receiver may advantageously be constituted by a loud-speaker or a headphone.

Of course, the invention should by no means be construed as being limited to the forms of embodiment described and illustrated, as the latter have been given by way of example only. In particular, the invention comprises all the means constituting technical equivalents to the means described, as well as their combinations, should the latter be carried out according to the spirit of the invention.

What is claimed is:

1. For use in an information-transmitting system, a trawler and a submerged trawl trailing behind the trawler, a gauge carried by said trawl and including a measuring device for measuring the depth of the submerged trawl, a transmit assembly for transmitting from the trawl to the trawler modulated electrical signals indicative of said depth, and said transmit assembly of said gauge comprising means for supplying a carrier signal, a coding means for modulating said carrier signal according to the depth measured by said measuring device of said gauge, and a dipole emitting the thus-obtained modulated electrical signals, said dipole including two emitting electrodes submerged at and disposed symmetrically with respect to the axis of said trawl on opposite sides of the latter, and receiving means carried by said trawler for receiving the signals, said receiving means including a dipole comprising two submerged receiving electrodes situated symmetrically with respect to the axis of said trawler on opposite sides thereof.

2. The combination of claim 1 and wherein said emitting electrodes are metal plates, said trawl having a given maximum width extending between a pair of opposed extreme points of said trawl situated on opposite sides of said axis thereof, and said plates being respectively situated at the latter points with each plate being oriented substantially perpendicularly with respect to a straight line extending from said plate to said trawler, and said receiving electrodes also being metal plates, the latter metal plates being oriented substantially perpendicularly with respect to the axis of said trawler.

3. The combination of claim 2 and wherein said means supplying said carrier signal includes an electronic converter for supplying a discontinuous carrier signal at a frequency ranging from several hundred to one thousand c.p.s.

4. The combination of claim 1 and wherein said measuring device includes a Bourdon tube having an entrance, said gauge including a water-tight casing provided with a dome-shaped streamlined element formed with holes for rendering null the dynamic component of the pressure at said entrance of said Bourdon tube.

5. A device for detecting the immersion depth of a trawl, characterized in that it comprises, on the one hand, a gauge carried by the trawl and constituted by a device for measuring the immersion depth of the said trawl and by a transmit assembly for transmitting underwater electric signals between the said trawl and the trawler without using any metal carrier for the said signals, the said transmit assembly comprising a dipole, the two emitting electrodes of which are disposed symmetrically with respect to the axis of the trawl, in areas of the latter remote from one another, and, on the other hand, a receiver carried by the trawler and comprising a dipole, the two receiving electrodes of which are immersed and disposed symmetrically with respect to the axis of the trawler, a coding device for controlling the supply of a signal by said transmit assembly for transmitting periodically the information supplied by the measuring device, said transmit assembly supplying a discontinuous signal which, under the action of said coding device, depends on the pressure value measured by the measuring device, said coding device being essentially constituted by a disk rotated at a uniform speed and having a code-carrying face, a moving member contacting said code-carrying face and having a displacement related to variations of the quantity to be measured, said disk and said moving member coacting for providing therebetween movement of said moving member from the center toward the periphery of said disk and from the periphery toward the center of said disk according to the sense of the variation of said quantity, said code-carrying face of said disk fixedly carrying a first stationary calibration curve and a second stationary calibration curve angularly displaced with respect to said first curve, with both of said curves being stationary with respect to said disk, said transmit assembly having an output signal provided with interruptions the duration of which is proportional to said quantity, lasting from the moment said moving member meets said first calibration curve until the moment said moving member meets said second calibration curve.

6. The combination of claim 5 and wherein said emitting electrodes are metal plates located at extreme points of the rope of greatest width of the spread trawl and oriented substantially perpendicularly to a straight line connecting each of the latter plates with the area occupied by said trawler, said receiving electrodes being metal plates which are substantially perpendicular to the axis of said trawler.

7. The combination of claim 6 and wherein the discontinuous signal has a frequency ranging from several hundred to one thousand c.p.s.

8. The combination of claim 5 and wherein said measuring device includes a Bourdon tube having an entrance, said gauge including a water-tight casing provided with a dome shaped streamlined element formed with holes for rendering null the dynamic component of the pressure at said entrance of said Bourdon tube.

9. In a system for transmitting information, a vessel having a longitudinal axis, a submerged unit trailing behind said vessel and having a longitudinal axis extending in the same general direction as said vessel axis, signal-transmitting means carried by said submerged unit and including a dipole having a pair of emitting electrodes situated symmetrically on opposite sides of said unit axis, and receiving means carried by said vessel for receiving signals from said transmitting means, said receiving means including a dipole having a pair of submerged receiving electrodes respectively situated symmetrically on opposite sides of said vessel axis.

10. The combination of claim 9 and wherein the distance between said emitting electrodes is several times as great as the distance between said receiving electrodes.

11. The combination of claim 9 and wherein said vessel has a hull, said receiving electrodes each being situated at a range of 1–4 m. outwardly beyond said hull.

References Cited

UNITED STATES PATENTS

| | | | |
|---|---|---|---|
| 3,038,143 | 6/1962 | Dow | 340—5 |
| 3,273,110 | 9/1966 | Monroe et al. | 340—4 |
| 3,273,393 | 9/1966 | Spark | 73—344 |

FOREIGN PATENTS

| | | | |
|---|---|---|---|
| 987,230 | 3/1965 | Great Britain | 340—3T |

RICHARD A. FARLEY, Primary Examiner

U.S. Cl. X.R.

73—427